Nov. 2, 1943.  G. I. GOODWIN  2,333,308
CLUTCH PLATE
Filed June 17, 1940  5 Sheets-Sheet 1
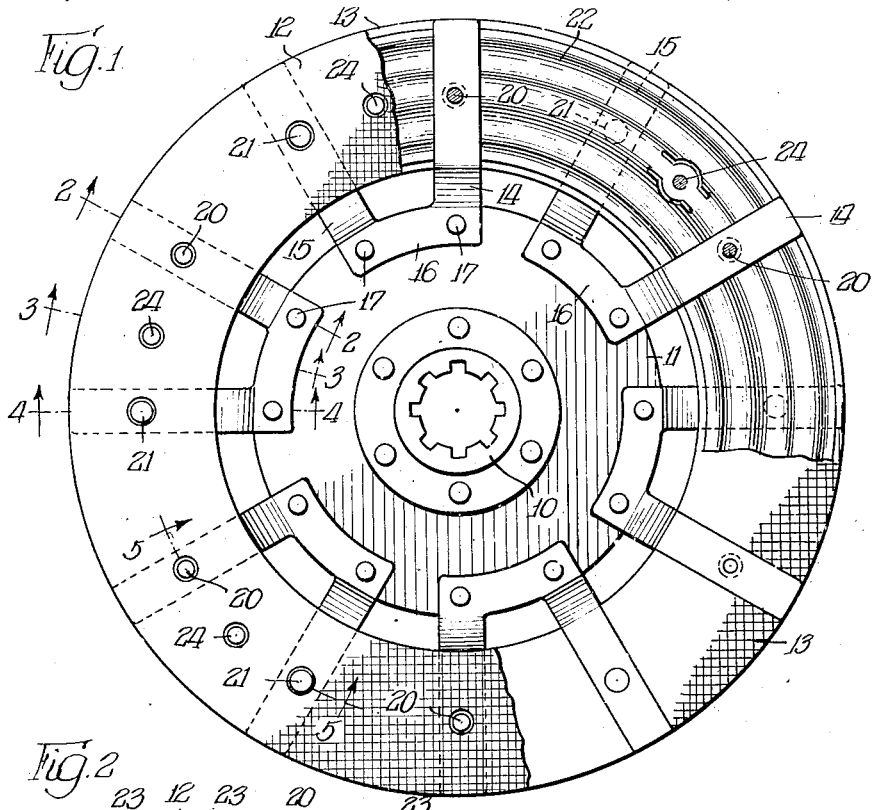
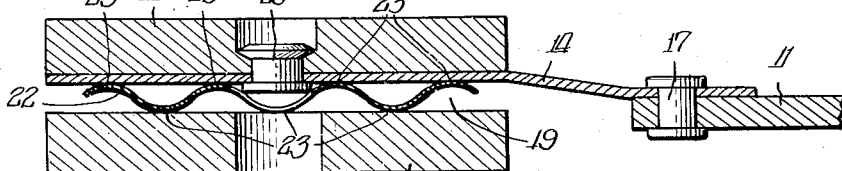
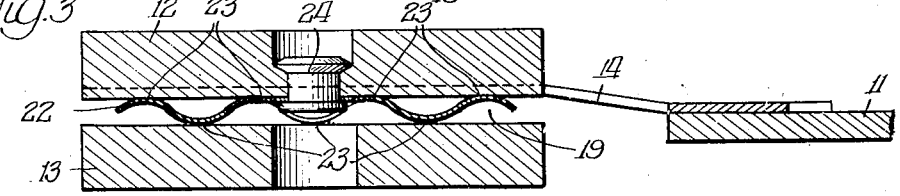
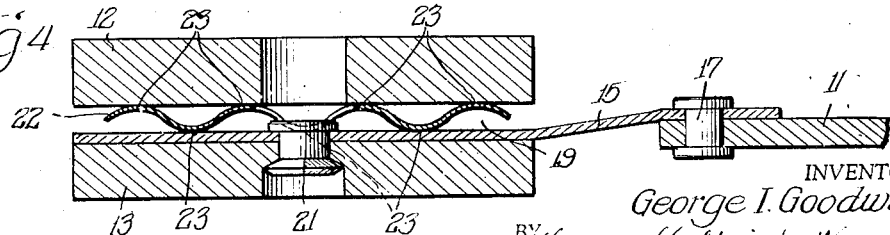
INVENTOR.
George I. Goodwin,
BY Cromwell, Greist + Warden
attys

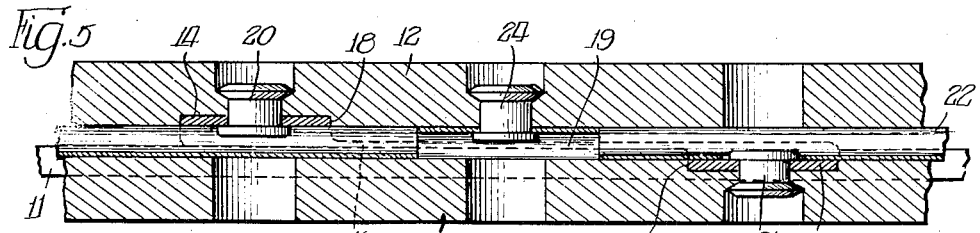
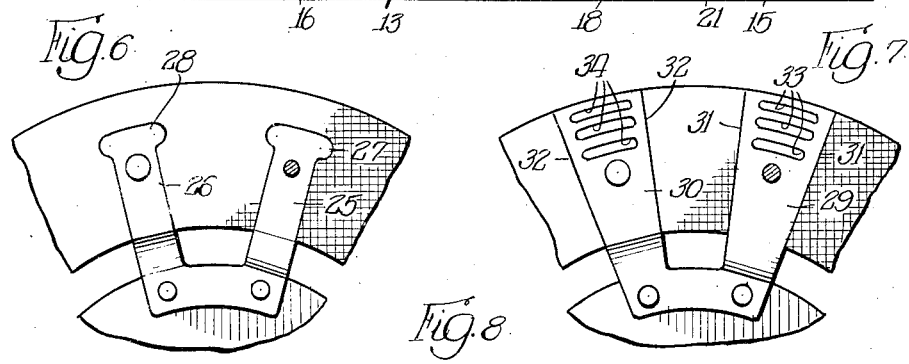
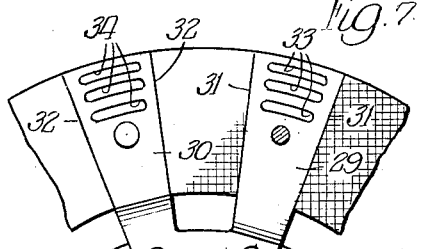
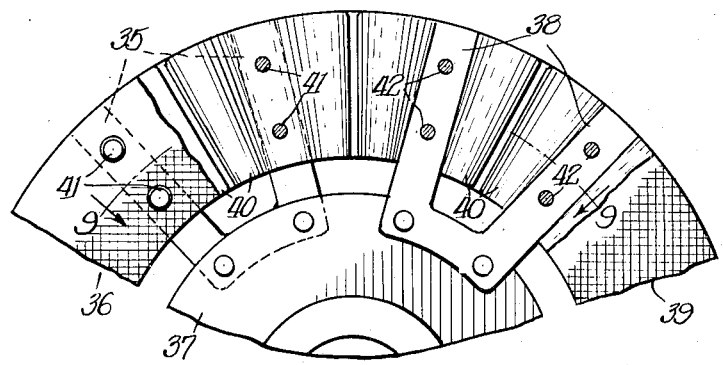
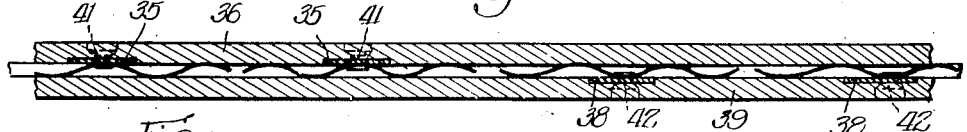
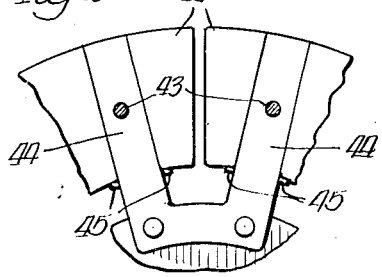

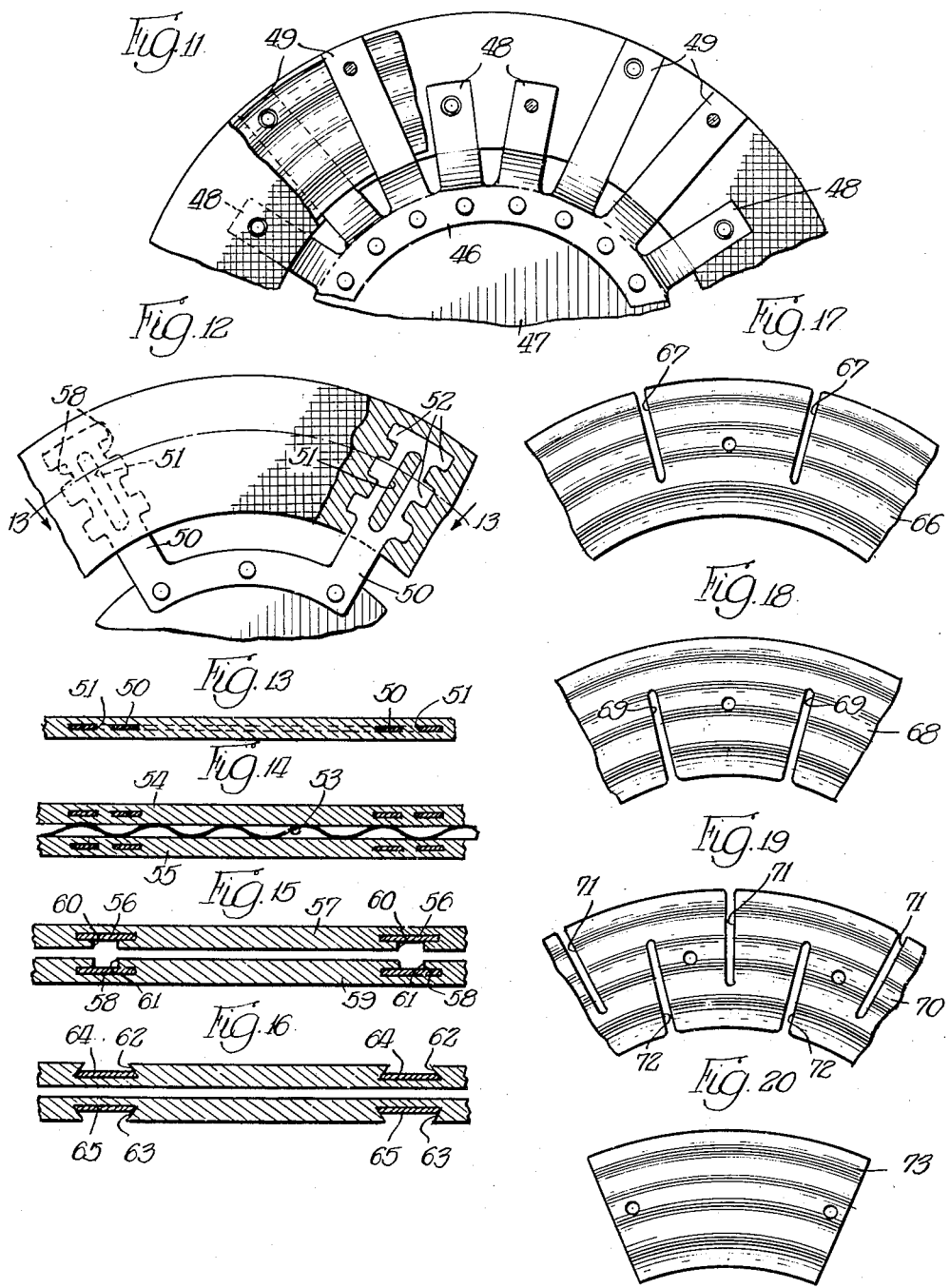

Nov. 2, 1943.  G. I. GOODWIN  2,333,308
CLUTCH PLATE
Filed June 17, 1940  5 Sheets-Sheet 4
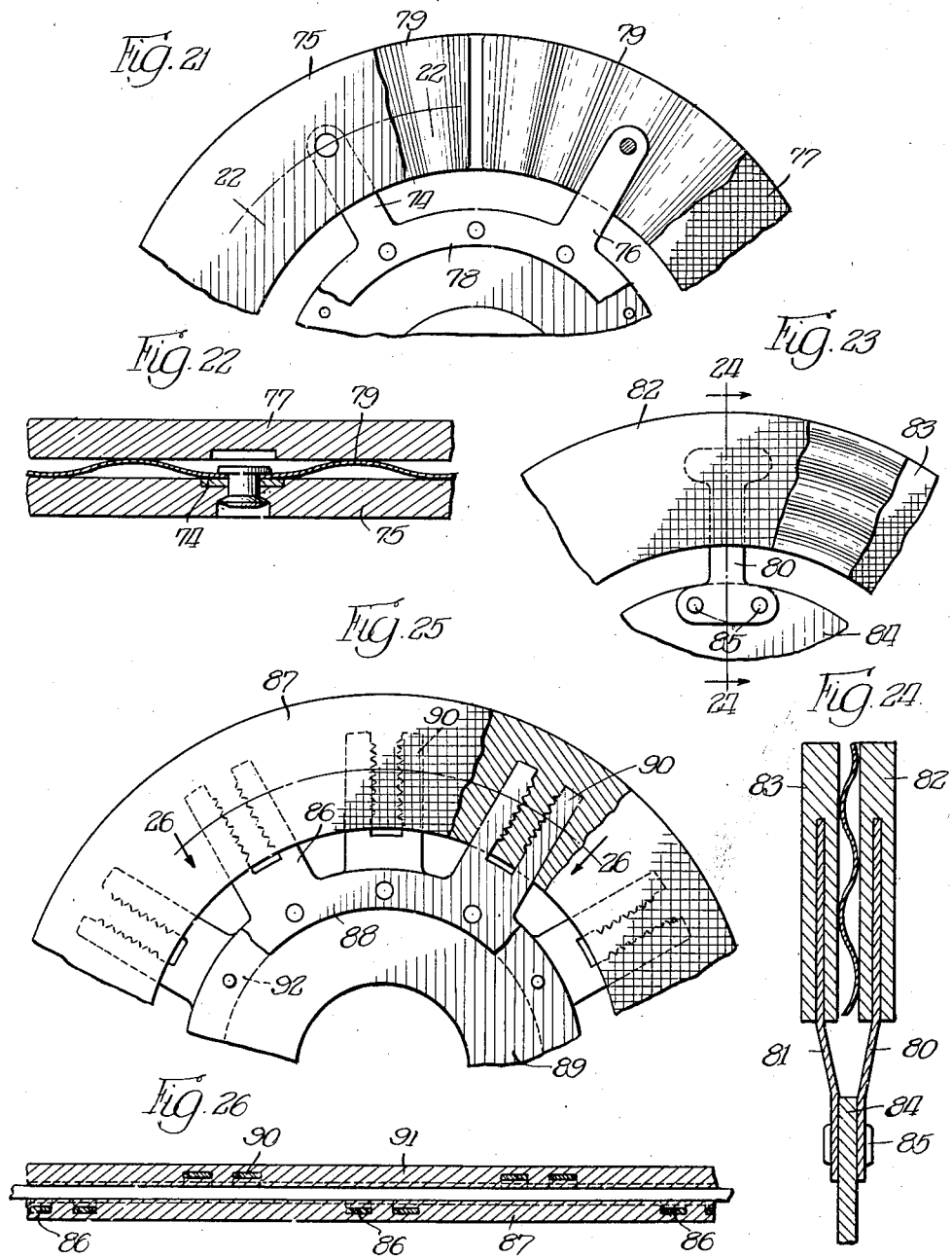
INVENTOR.
George I. Goodwin,
BY Cromwell, Greist & Warden
Attys.

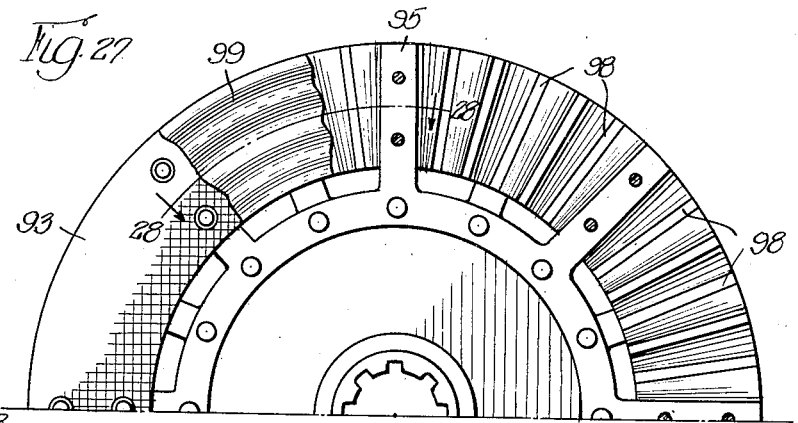
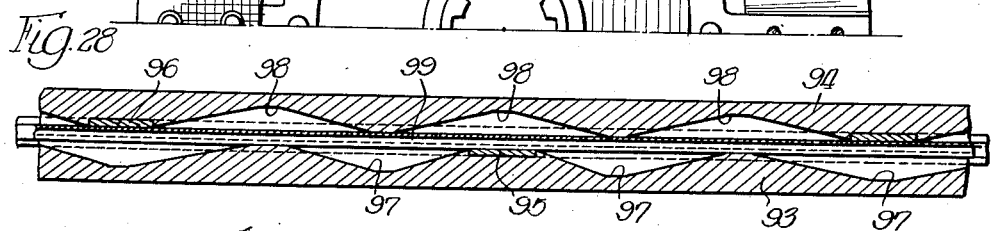
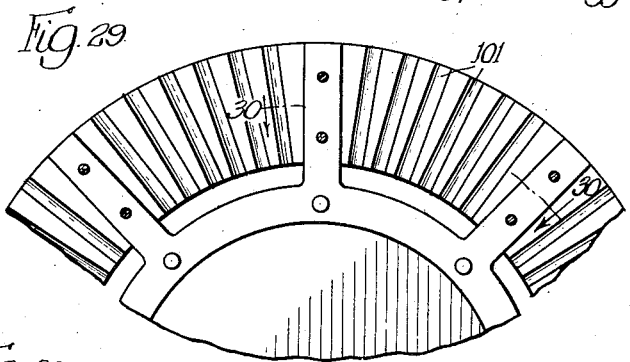
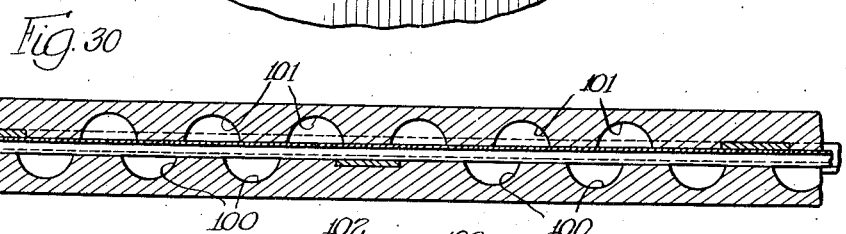
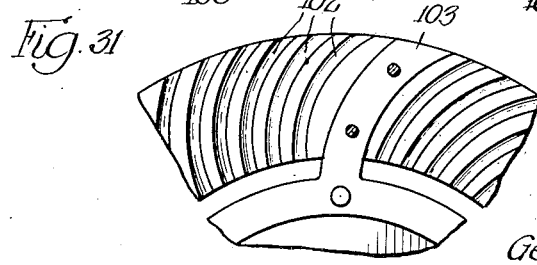

Patented Nov. 2, 1943

2,333,308

UNITED STATES PATENT OFFICE 2,333,308

CLUTCH PLATE

George I. Goodwin, Detroit, Mich.

Application June 17, 1940, Serial No. 340,902

10 Claims. (Cl. 192—107)

The present invention relates to clutch plates of the type in which a resiliently yieldable cushioning structure is employed adjacent the periphery of the plate between the annular friction facings.

One of the objects of the invention is to provide an improved clutch plate of the type described in which the friction facings are mounted on special driving members which are so attached to the facings as to provide an uninterrupted and circumferentially continuous space between the facings for the accommodation of the cushioning means.

Another object of the invention is to provide, in such a clutch plate, a cushioning member which is not subjected to torsional stresses and may therefore be made of extremely thin material and distorted axially to provide a large number of points of support for both facings—the combination of the thinness of the material with the large number of the supporting points affording a highly resilient and practically uniform support over the entire areas of the backs of the facings and at the same time permitting a cushion deflection in line with present practice (.050" to .060") without overstressing the material from which the cushion is formed.

Another object is to provide a cushioned clutch plate in which the spinning inertia of the same is reduced not only by the lightness of the cushioning structure but by a reduction in the weight of the facings themselves brought about by the formation of grooves which reduce the mass of the facings without materially affecting their strength or capacity for wear.

Another object of the invention is to provide, in a cushioned clutch plate, a cushioning structure which is of extremely light weight, presents a large number of uniformly distributed supporting points for the facings, is free from torsional stresses, and is designed to rapidly dissipate heat.

Another object of the invention is to provide, in a cushioned clutch plate, improved means for attaching and driving the facings, which means is of very light weight, is not required to act on the facings through the cushioning elements, and does not take up any space which should or could be occupied by the cushioning elements in allowing the latter to provide complete uniformity and symmetry of support for the entire facing area.

Another object is to provide a cushioned clutch plate in which the area of contact between the facings and the cushioning means is materially reduced, and the rate of heat transfer between the same by direct conduction proportionately reduced.

Still another object is to provide a cushioned clutch plate in which grooves are provided in the rear surfaces of the facings to allow air circulation through such grooves, thus reducing the temperature of the facings and the cushioning means.

While the foregoing statements are indicative in a general way of the nature of the invention, other more specific objects and advantages will be apparent to those skilled in the art upon a full understanding of the improved means for separately supporting and cushioning the facings.

In order that the invention may be readily understood a number of illustrative embodiments are presented herein, but it will of course be appreciated that such embodiments are intended merely for the purpose of exemplification and that the invention is susceptible of being incorporated in many other structurally modified forms coming equally within the scope of the appended claims.

In the accompanying drawings:

Fig. 1 is a partially broken away face view of a clutch plate which embodies one form of the invention;

Fig. 2 is an enlarged radial section through the clutch plate shown in Fig. 1, taken on the line 2—2 of Fig. 1;

Fig. 3 is a similar section, taken on the line 3—3 of Fig. 1;

Fig. 4 is a similar section, taken on the line 4—4 of Fig. 1;

Fig. 5 is a section, taken on the arcuate line 5—5 of Fig. 1;

Fig. 6 is a fragmentary face view of a clutch plate, with the near facing and cushioning means removed, showing a modified form of means for attaching and driving the facings;

Fig. 7 is a view similar to Fig. 6 but shows another modified means of attaching and driving the facings;

Fig. 8 is a partially broken away face view of a portion of another clutch plate, showing a further modification of the invention;

Fig. 9 is a section taken on the arcuate line 9—9 of Fig. 8;

Fig. 10 illustrates a modification of the driving members shown in Fig. 8;

Fig. 11 is a fragmentary partially broken away face view of a clutch plate incorporating another modification of the invention;

Fig. 12 shows a modification in which the driving members are molded entirely within the facings;

Fig. 13 is a section, taken on the arcuate line 13—13 of Fig. 12;

Fig. 14 is a corresponding section through a completely assembled clutch plate employing the construction shown in Figs. 12 and 13, with a light-weight torsion-free cushioning element between the two facings;

Fig. 15 is a corresponding section through a modified construction, with the cushioning means removed, the driving members confined in the facings in radial slots of T-shaped cross section;

Fig. 16 shows a modification in which the driving members are positioned in slots in the friction, as distinguished from the rear, faces of the facings;

Figs. 17, 18, 19 and 20 show a view of the many different cushioning elements that might be employed between the facings in a clutch plate in which the facings are supported and driven in accordance with the invention;

Fig. 21 is a fragmentary partially broken away view of another clutch plate, showing another modification of the invention;

Fig. 22 is a section, taken on the arcuate line 22—22 of Fig. 21;

Fig. 23 illustrates another modification of the special means employed for attaching and driving the facings;

Fig. 24 is a radial section, taken on the line 24—24 of Fig. 23;

Fig. 25 illustrates another modification of the special means employed for attaching and driving the facings; and Fig. 26 is a section, taken on the arcuate line 26—26 of Fig. 25.

Fig. 27 shows another modification in which the backs of the facings are provided with air-circulating grooves between the supporting tongues;

Fig. 28 is an arcuate section, taken on the line 28—28 of Fig. 27;

Figs. 29 and 30 correspond respectively to Figs. 27 and 28, with Fig. 30 taken on the line 30—30 of Fig. 29, but show air-circulating grooves of a somewhat different design; and Fig. 31 shows still another modification in which the air-circulating grooves and the tongues supporting the facings are curved instead of straight.

The clutch plate shown in Figs. 1 to 5 inclusive will first be described. This plate includes a hub 10, a disk 11 which is secured at its center to the hub, and two annular friction facings 12 and 13 which are located beyond the outer periphery of the disk. The facing 12 is supported and driven by a plurality of outwardly projecting tongues 14. The facing 13 is spaced axially from the facing 12 and is likewise supported and driven by a plurality of outwardly projecting tongues 15. Each of the tongues 14 is connected with one of the tongues 15 by a circumferentially extending strip 16 which is secured by rivets 17 to the outer edge of the disk 11. The outer portion of the tongues 14 are deflected axially to one side of the plane of the strips 16, while the outer portions of the tongues 15 are deflected to the opposite side of such plane, all as clearly shown in Figs. 2, 4 and 5.

The tongues 14 and 15 are inlaid in the backs of the facings 12 and 13, flush with the latter, in snugly conforming grooves 18 provided for the reception of the same, leaving a clear, unobstructed and circumferentially continuous space 19 between the separated backs of the facings. The facing 12 is attached to the tongues 14 by rivets 20, while the facing 13 is attached to the tongues 15 by rivets 21. The tongues 14 and 15 are axially flexible but circumferentially rigid, thus providing adequate support and torque transmission for the facings while allowing the latter to move freely toward and away from each other. The tongues 14 and 15 are made of a metal having at least some resiliency and are preferably given an initial bias toward the plane of the connecting strip 16 (not visible from the drawings) in order to cause the facings to tend to hug the hereinafter described cushion positioned between the same.

The annular space 19, which extends from the back of the facing 12 to the back of the facing 13, and from the outer edges of the facings to the inner edges of the same, is occupied by a cushion of resilient material, which cushion may be in the form of a single annular member 22, or else in the form of a plurality of separate members. The space 19 is fully occupied by the cushion member 22 in the sense that the axially spaced contour planes of the latter substantially coincide with the planes of the backs of the facings.

The cushion member 22 is preferably made of light thin spring steel, and is preferably deformed axially to provide a large number of uniformly distributed supporting points 23 for engagement with the backs of the facings. The deformations in the member 22 are shown as concentric corrugations, but it will of course be appreciated that there is virtually no limit to the number of different forms which the deformations may take. The cushion member 22 is not required to either support or drive the facings— all that is required of it is to provide the desired resiliency to yieldingly resist movement of the backs of the facings toward each other during compression of the plate. Because of this freedom from torsional stress there is practically no limit to the thinness, number of deformations, pattern of contact points, number of pieces, or shape that the cushion member may have. The cushion member is held in position between the facings by rivets 24, which rivets secure the same to the back of one of the facings.

In the modification shown in Fig. 6 the supporting tongues 25 and 26 for the axially spaced facings terminate inwardly of the outer edges of the facings and are attached to the latter by single rivets. These tongues are provided with enlarged head portions 27 and 28 which fit flush within correspondingly shaped enlargements in the grooves in the backs of the facings, in radially as well as circumferentially interlocking engagement with the facings.

In the modification shown in Fig. 7, the supporting tongues 29 and 30 are provided with outwardly diverging side edges 31 and 32 which likewise interlock radially with the grooves in the backs of the facings. These particular tongues are also provided near their outer ends with openings 33 and 34 which act to reduce the weight of the tongues and thereby further decrease the spinning inertia of the plate as a whole.

In the modification shown in Figs. 8 and 9 the supporting tongues 35 for the facing 36 are paired together and attached to one side of the disk 37, while the supporting tongues 38 for the facing 39 are similarly paired together and attached to the other side of the disk 37. The cushion in this particular assembly is shown as a plurality of radially corrugated spring segments 40, which segments, instead of being attached directly to the backs of the facings, are attached to the tongues 35 and 38, by the same rivets 41 and 42 as are used in attaching the facings 36 and 39 to the tongues 35 and 38.

The construction shown in Fig. 10 is the same as that shown in Fig. 9 except for the fact that single attaching rivets 43 are employed and the spring segments 40 constituting the cushion are prevented from turning with respect to the tongues 44 by angularly bent lips 45 on the inner edges of the segments which embrace the tongues just inwardly of the inner edges of the facings.

In the modification shown in Fig. 11 the supporting tongues for the facings are all formed as integral radially projecting portions of a single annulus 46 which is attached to the center portion 47 of the plate, and certain of the tongues 48 are of less radial extent than the other tongues 49. In this construction each of the facings is preferably attached to every other tongue, resulting in each of the facings being attached alternately to short and long tongues.

In the modification shown in Figs. 12 and 13 the supporting tongues 50 for each of the facings are molded entirely within the surfaces of the latter, preferably about midway between their friction surfaces and their backs, and are provided with center openings 51 and edge notches 52, which formations not only lighten the tongues but also aid in securely anchoring the same in the molded material of the facings. In Figs. 12 and 13 only one of the facings, with its supporting tongues, is shown, but it will of course be appreciated that where two axially spaced facings are employed the other facing will preferably be mounted on its supporting tongues in the same fashion, leaving an unobstructed opening between the facings for the reception of the cushion.

In Fig. 14 such an assembly is shown, a cushion 53 of radially corrugated form being positioned between the facings 54 and 55.

In the modification shown in Fig. 15 the supporting tongues 56 for the facing 57 and the supporting tongues 58 for the facing 59 are molded within the facings near the centers of the latter, and relatively narrow open grooves 60 and 61 are preferably provided in register with the centers of the tongues. These grooves faciiltate fabrication.

In the modification shown in Fig. 16 a somewhat similar construction is shown in which the grooves 62 and 63 for the reception of the supporting tongues 64 and 65 are of dovetail cross section whereby to give the light-weight and cooling effects above referred to and at the same time allow the tongues to be flattened out at the time of assembly into tightly interlocked engagement with the sides of the grooves.

In Figs. 17, 18, 19 and 20 various cushion structures are shown, suitable for use with any clutch plate assembly constructed in accordance with the invention. These are obviously but a few of the many different cushion formations that might be employed. In Fig. 17 the cushion 66 is circumferentially continuous and provided at intervals in its outer edge with slots 67. The cushion 68 shown in Fig. 18 is provided with slots 69 in its inner edge. The cushion 70 shown in Fig. 19 is provided with slots 71 in its outer edge and slots 72 in its inner edge, with the slots 71 alternating with the slots 72. The cushion 73 shown in Fig. 20 is a segmental section which is adapted to be combined with similar sections to form an annulus.

The modification shown in Figs. 21 and 22 is somewhat similar to that shown in Figs. 8 and 9 except for the fact that the tongues 74 which support the facing 75 and the tongues 76 which support the facings 77 are formed as integral but axially offset portions of an annulus 78 and the radially corrugated cushion members 79 are of considerably greater circumferential extent.

In the modification shown in Figs. 23 and 24 the supporting tongues 80 and 81 for the facings 82 and 83 are made as separate members and are attached to the opposite sides of the center portion 84, in axial registration with each other, by rivets 85.

In the modification shown in Figs. 25 and 26, the supporting tongues 86 for the facing 87 are formed as integral portions of an annulus 88 attached to one side of the center portion 89 of the clutch plate, while the tongues 90 which carry the facing 91 are formed as integral portions of a separate annulus 92 secured to the opposite side of the center portion 89.

In the modification shown in Figs. 27 and 28 the axially spaced facings 93 and 94 are provided, intermediate the inlaid supporting tongues 95 and 96, with radially extending grooves 97 and 98, which grooves greatly reduce the area of contact of the cushion member 99 with the backs of the facings, resulting in less heat conduction, lighten the facings, and provide radially extending passages for the circulation of cooling air currents, even when the cushion is fully flattened out.

In the modification shown in Figs. 29 and 30 a somewhat similar construction is provided in which the grooves 100 and 101 are separated from each other by intervening flat portions on the backs of the facings.

In the modification shown in Fig. 31 the grooves 102 between the facing supporting tongues are curved circumferentially near their outer ends, and the tongues 103 are correspondingly curved.

I claim:

1. In a clutch plate, the combination with a disk, and a pair of annular friction facings beyond the outer edge of the disk provided at circumferentially spaced intervals with recesses which terminate short of the friction faces of the facings, of axially flexible but circumferentially rigid means carried by the disk and secured within the recesses to the facings within the axial dimensions of the latter for supporting the facings in axially separated relation, thereby providing an unobstructed circumferentially continuous space between the backs of the facings and their outer and inner edges, and a cushion positioned in said space in direct engagement with the backs of the facings for yieldingly resisting compression of the plate.

2. In a clutch plate, the combination with a disk, and a pair of annular friction facings beyond the outer edge of the disk provided at circumferentially spaced intervals with recesses which terminate short of the friction faces of the facings, of axially flexible but circumferentially rigid means carried by the disk and secured within the recesses to the facings within the axial dimensions of the latter for supporting the facings in axially separated relation, thereby providing an unobstructed circumferentially continuous space between the backs of the facings and their outer and inner edges, a cushion positioned in said space in direct engagement with the backs of the facings for yieldingly resisting compression of the plate, and means for attaching the cushion to the back of one of the facings.

3. In a clutch plate, the combination with a disk, and a pair of annular friction facings beyond the outer edge of the disk, of two sets of outwardly projecting tongues carried by the disk, with the tongues in one set axially offset with respect to the tongues in the other set, the tongues in the two sets being inlaid in grooves in the backs of the two facings, providing an unobstructed circumferentially continuous space between the backs of the facings and their outer and inner edges, and a light-weight cushion of thin spring material positioned in said space in direct engagement with the backs of the facings, and means for attaching the cushion to the the back one of the facings.

4. In a clutch plate, the combination with a disk, and a pair of annular friction facings beyond the outer edge of the disk, of two sets of outwardly projecting tongues carried by the disk, with the tongues in one set axially offset with respect to the tongues in the other set, the tongues in the two sets being inlaid in grooves in the backs of the two facings, providing an unobstructed circumferentially continuous space between the backs of the facings and their outer and inner edges, and a light-weight cushion of thin spring steel in the form of a one-piece annulus positioned in said space, and means for attaching the cushion to the back of one of the facings independently of the tongues.

5. A clutch driven plate assembly having a pair of friction facings, cushion means occupying all of the space between said facings, and means for attaching each facing to the central part of the assembly with a portion of the attaching means extending outwardly into overlapped engagement with a portion of the facing, and with that portion of the attaching means which lies in overlapping relationship to the facing disposed axially outside of the space occupied by said cushion means and within the axial dimensions of the facing.

6. A friction facing for use in a clutch driven plate, which facing is provided with shallow circumferentially spaced slots for the reception of inlaid driving means, which slots are located in the rear face only of the facing and terminate short of the friction face thereof.

7. In a clutch plate having a pair of friction facings provided with spaced slots, spoke-like driving means in said slots, said driving means tending to urge the facings toward each other.

8. A clutch plate having a pair of axially spaced friction facings, axially flexible but circumferentially rigid means for supporting each of said facings, said facings being provided in their confronting faces with grooves, and said supporting means having portions which overlie the facings and are contained wholly within said grooves, whereby said facings and the supporting means for the same are arranged to provide an unobstructed circumferentially continuous space between the backs of the facings between their inner and outer edges, and a cushion positioned in said space in direct engagement with the backs of both facings for yieldingly resisting compression of the plate.

9. In a clutch plate, the combination with a disk, and a pair of annular friction facings beyond the outer edge of the disk, of tongue-like sheet metal members which are substantially thinner than the disk and are fixedly attached to the latter in outwardly projecting relation thereto, said tongue-like members being attached to the facings within the axial dimensions of the latter for supporting the facings in axially separated relation and being axially flexible but circumferentially rigid, said members providing an unobstructed circumferentially continuous space between the backs of the facings and their outer and inner edges, and a cushion positioned in said space in engagement with the backs of both facings for yieldingly resisting compression of the plate.

10. In a clutch plate, the combination with a disk, and a pair of annular friction facings beyond the outer edge of the disk, of tongue-like sheet metal members which are substantially thinner than the disk and are fixedly attached to the latter in outwardly projecting relation thereto, said tongue-like members being attached to the facings within the axial dimensions of the latter for supporting the facings in axially separated relation and being axially flexible but circumferentially rigid, said members providing an unobstructed circumferentially continuous space between the backs of the facings and their outer and inner edges, and a cushion positioned in said space in engagement with the backs of both facings for yieldingly resisting compression of the plate, said tongue-like members being of spring material and tending to urge the facings into engagement with the interposed cushion.

GEORGE I. GOODWIN.